United States Patent [19]
Weaver et al.

[11] Patent Number: 5,446,671
[45] Date of Patent: Aug. 29, 1995

[54] LOOK-AHEAD METHOD FOR MAINTAINING OPTIMUM QUEUED QUANTITIES OF IN-PROCESS PARTS AT A MANUFACTURING BOTTLENECK

[75] Inventors: Craig M. Weaver, Boise; Ruth A. Allison, Kuna; Grace G. Metsker, Boise; Jeanne M. Clemons, Boise; Douglas S. Durham, Boise, all of Id.; Gary A. Sabin, Cupertino, Calif.; Keven A. Hope, Boise, Id.

[73] Assignee: Micron Semiconductor, Inc., Boise, Id.

[21] Appl. No.: 142,252

[22] Filed: Oct. 22, 1993

[51] Int. Cl.$^6$ .............................. G06F 17/60
[52] U.S. Cl. .......................... 364/468; 364/402
[58] Field of Search ........... 364/468, 478, 402, 401

[56] References Cited

U.S. PATENT DOCUMENTS

| | | | |
|---|---|---|---|
| 4,309,600 | 1/1982 | Perry et al. | 364/468 |
| 4,888,692 | 12/1989 | Gupta et al. | 364/402 |
| 5,229,948 | 7/1993 | Wei et al. | 364/468 |

FOREIGN PATENT DOCUMENTS 63-39746  2/1988  Japan .................. 364/468

*Primary Examiner*—Roy N. Envall, Jr.
*Assistant Examiner*—Steven R. Garland

[57] ABSTRACT

This invention is a look-ahead method for determining optimum production schedules for each production step based on factory-wide monitoring of in-process part queues at all potential production bottlenecks. For each product having associated therewith a throughput bottleneck, a maximum queue quantity $Q_{MAX}$ and a minimum queue $Q_{MIN}$ quantity are assigned. When a machine completes a lot of a particular product at a production step P that proceeds the bottleneck step B, the look-ahead method is initiated. The queue at step P is searched and the next lot to be processed is selected. If that lot is a product for which $Q_{MAX}$ and $Q_{MIN}$ values have been assigned at step B, then the queue quantity at step B is determined. If, on one hand, the queue quantity at step B is less than $Q_{MAX}$, or between $Q_{MAX}$ and $Q_{MIN}$ and the queue quantity is climbing upward from a sub-$Q_{MIN}$ value and has not yet exceeded its $Q_{MAX}$ value, then the lot is processed without further analysis. If, on the other hand, the queue quantity at step B is greater than $Q_{MAX}$, or between $Q_{MAX}$ and $Q_{MIN}$ and the queue quantity is descending from a quantity greater than its $Q_{MAX}$ and has not yet fallen below its $Q_{MIN}$ value, then that product has a set flag status associated therewith, and the lot will not be processed until after all other lots which have a clear flag status are processed.

15 Claims, 6 Drawing Sheets

STEP 1:

WIRE BOND QUEUE

| A | B | C | D |
|---|---|---|---|
| A | B | C | D |
| A | B |   | D |
|   | B |   | D |
|   | B |   | D |

LOTS

WIRE BOND EQUIPMENT SETUP

| 1 | 2 | 3 | 4 |
|---|---|---|---|
| A | A | D | B |

| 5 | 6 | 7 | 8 |
|---|---|---|---|
| A | C | D | B |

STEP 2: DIE COAT STEP

STEP 3:

ENCAP QUEUE

| A | B | C | D |
|---|---|---|---|
| A | B | C |   |
| A |   | C |   |
| A |   | C |   |
| A |   |   |   |
| A |   |   |   |
| A |   |   |   |
| A |   |   |   |

LOTS

ENCAP EQUIPMENT SETUP

| 1 | 2 | 3 | 4 |
|---|---|---|---|
| B | C | A | D |

| 5 | 6 | 7 | 8 |
|---|---|---|---|
| B | C | D | D |

FIG. 1

STEP P QUEUE DATA FILE:

| PRODUCT ID | LOT # | PRIORITY | IN PROCESS | NU WORK |
|---|---|---|---|---|
| ⋮ | ⋮ | ⋮ | ⋮ | • |

STEP B QUEUE DATA FILE:

| PRODUCT ID | LOT # | IN PROCESS |
|---|---|---|
| ⋮ | ⋮ | ⋮ |

PROGRAM DATA FILE:

| PRODUCT | $Q_{MAX}$ | $Q_{MIN}$ | $Q_{NOW}$ | $Q_{THR}$ | $Q_{AVL}$ |
|---|---|---|---|---|---|
| A | • | • | • | • | • |
| B | • | • | • | • | • |
| C | • | • | • | • | • |
| D | • | • | • | • | • |
| n | • | • | • | • | • |

FIG. 2

LOOK-AHEAD METHOD FOR MAINTAINING OPTIMUM QUEUED QUANTITIES OF IN-PROCESS PARTS AT A MANUFACTURING BOTTLENECK

FIELD OF THE INVENTION

This invention relates to computerized manufacturing control systems and, more particularly, to systems aimed at optimizing utilization of universal equipment that feeds a production step containing one or more potential bottlenecks.

BACKGROUND OF THE INVENTION

In a production environment, bottlenecks typically occur from time to time at various steps in the process due to a multitude of causes. Such causes may include, but are not limited to, lack of raw materials, personnel shortages, machine malfunctions, non-continuity of the normal process flow, hold orders placed on particular product types due to a discovered process deviation at a previous manufacturing step, misallocation of production resources at a prior step that results in excess buildup of a particular type of unfinished product at a following step.

Prior attempts to deal with the problem of bottlenecks have been less than optimum because they focused on the step immediately preceding the bottleneck, and failed to consider the interrelated nature of the entire production line. What is needed is a look-ahead method for determining optimum production schedules for early production steps based on a system of monitoring in-process part queues at subsequent production steps which represent production bottlenecks. Such a look-ahead method will stop the flow of unneeded parts through the early production step that would not be processed in a timely manner as they pile up at the bottleneck step. Thus, manufacturing resources at the early production step would be better utilized.

SUMMARY OF THE INVENTION

This invention is a look-ahead method, designed for implementation on an electronic data processing system, for determining optimum production schedules for an early production steps by monitoring in-process part queues at subsequent potential bottleneck production steps and controlling the product mix at the early production steps. The method basically functions in the following manner:

(a) one or more throughput bottlenecks are determined to exist for particular products at a particular step in the manufacturing sequence;

(b) for each product having associated therewith a throughput bottleneck, a maximum queue quantity $Q_{MAX}$ and a minimum queue $Q_{MIN}$ quantity are assigned. Such quantities are determined by management personnel based on the capacity and cycle time of the product;

(c) when a machine completes a lot of a particular product at a production step P that proceeds the bottleneck step B, the look-ahead method is initiated;

(d) the queue at step P is searched and the next lot to be processed is selected;

(e) if the next lot is for a product for which no $Q_{MAX}$ and $Q_{MIN}$ values have been assigned at step B, then the product is assumed to have no bottleneck and it is processed without analyzing the queue at step B;

(f) however, if the next lot is a product for which $Q_{MAX}$ and $Q_{MIN}$ values have been assigned at step B, then the queue quantity $Q_{NOW}$ at step B is determined;

(g) if, on one hand, $Q_{NOW}$ at step B is less than $Q_{MAX}$, or between $Q_{MAX}$ and $Q_{MIN}$ and $Q_{NOW}$ is climbing upward from its $Q_{MIN}$ and has not yet reached its $Q_{MAX}$ value (i.e., there is a clear flag status associated with the product), then the lot is processed without further analysis; and (h) if, on the other hand, $Q_{NOW}$ at step B is greater than $Q_{MAX}$, or between $Q_{MAX}$ and $Q_{MIN}$ and $Q_{NOW}$ is descending from its $Q_{MAX}$ and has not yet reached its $Q_{MIN}$ value (i.e., there is a set flag status associated with the product) the lot will not be processed until after all other lots meeting the conditions of step (g) have been processed.

Just as a hysteresis function in the set points of a voltage regulator prevent hovering around a single reference voltage, the range between the $Q_{MAX}$ and $Q_{MIN}$ values in this look-ahead scheduling method prevents thrashing conditions around a set point, characterized by the see-saw scheduling of multiple products.

BRIEF DESCRIPTION OF THE DRAWINGS

FIG. 1 is a hypothetical production environment having three production steps, four product types, and multiple universal production resources (e.g., equipment) equipment at each of the production steps;

FIG. 2 contains a samples a Step P Queue Data File, a Step B Queue Data File, and a Program Data File.

PREFERRED EMBODIMENT OF THE INVENTION

Figure 3A:
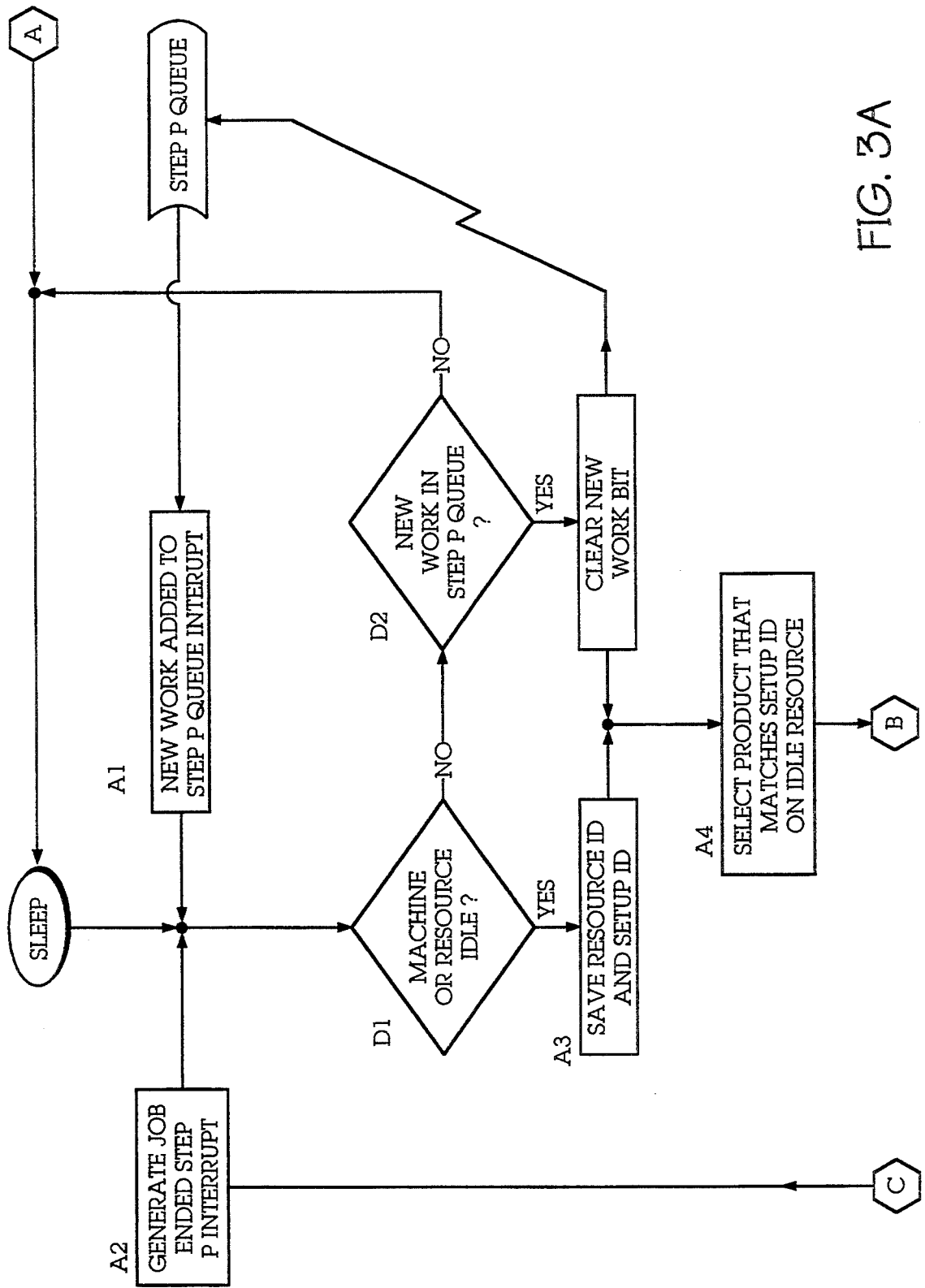
FIGS. 3A-3D provide a system architecture flow chart for the look-ahead method.

Referring now to FIG. 1, various products A, B, C, and D are manufactured in the production environment depicted in FIG. 1. Three sequential production steps (S1, S2, and S3) are enumerated. In a semiconductor manufacturing process, such steps might be a wire bonding step (in which contact is made with fine wire between the bond pads of a semiconductor die and the various leads of a leadframe), a die coat step (in which the upper surface of the semiconductor die is coated with a polymer material), and an encapsulation step (in which the semiconductor die and the leadframe on which it is attached are encapsulated in plastic material).

Still referring to FIG. 1, at step S1, all four products are present in the queue. There are three lots of product A, five of product B, two of product C, and five of product D. At step S1, there are eight universal machines. By universal, it is meant that each machine may be converted to process any of the four products. Machines 1, 2, and 5 are presently set up to process product A, machines 4 and 8 are set up to process product B, machine 6 is set up to process product C, and machines 3 and 7 are set up to process product D.

Still referring to FIG. 1, at step S3, there are eight lots of product A, two of product B, four of product C, and three of product D. At step S3, there are also eight universal machines. Machine 3 is presently set up to process product A, machines 1 and 2 are set up to process product B, machines 2 and 6 are set up to process product C, and machines 4, 7, and 8 are set up to process product D.

In the scenario depicted in FIG. 1, it is assumed that step S2 is not a factor in throughput. This may be due to a number of factors, several of which might be low setup time for product changes, rapid throughput per piece of equipment, and an abundance of equipment.

In the hypothetical example of FIG. 1, $Q_{MAX}$ and $Q_{MIN}$ values have been assigned to products A, B, C, and D. A flag status will be associated with each queue quantity $Q_{NOW}$ at step S3. The following chart demonstrates how the flag status is imposed or withdrawn.

|  | $Q_{MAX}$ | $Q_{MIN}$ | $Q_{present}$ | Flag |
|---|---|---|---|---|
| Product A | 6 lots | 3 lots | 8 lots | set |
| Product B | 3 lots | 2 lot | 2 lots | clear |
| Product C | 5 lots | 2 lots | 4 lots | set |
| Product D | 4 lots | 2 lots | 1 lot | clear |

In the case of product A, $Q_{NOW}$ has exceeded the $Q_{MAX}$ value assigned to product A, which is 6 lots. Thus, a flag is set for product A, so that no additional lots of product A will be processed at step S1 until $Q_{NOW}$ is less than the $Q_{MIN}$ value assigned to product A, which is three lots.

In the case of product B, $Q_{NOW}$ is less than the $Q_{MAX}$ value assigned to product B, which is 3 lots, and equal to the $Q_{MIN}$ value assigned to that product, which is 2 lot. If $Q_{NOW}$ is recovering from a recent $Q_{MIN}$ value, its flag status will be clear until $Q_{NOW}$ is greater than the $Q_{MAX}$ for product B. On the other hand, if $Q_{NOW}$ is recovering from a recent $Q_{MAX}$ value, its flag status will be set and will remain so until $Q_{NOW}$ drops below the $Q_{MIN}$ for that product. Since the flag status for product B is clear, we know that $Q_{NOW}$ is recovering from a sub-$Q_{MIN}$ value.

In the case of product C, $Q_{NOW}$ is less than the $Q_{MAX}$ value assigned to product C, which is 5 lots, and greater than the $Q_{MIN}$ value assigned to that product, which is 2 lots. For product C, the flag status is set. Therefore, we know that $Q_{NOW}$ is recovering from a value greater than $Q_{MAX}$. The flag status will be cleared only when $Q_{NOW}$ has dropped to a value less than $Q_{MIN}$.

In the case of product D, $Q_{NOW}$ is equal to 1 lot, which is less than $Q_{MIN}$ of 2 lots that was assigned to that product. Therefore, the flag status has been cleared.

One might reasonably ask, as in the example of FIG. 1, how $Q_{NOW}$ values can exceed $Q_{MAX}$ values by more than one lot. Depending on the method of maintaining a running tally of in-process parts, there may be some slack. If the inventory is measured only with regard to product queued for immediate processing at a particular step, other product at intermediate production steps may show up at the step where measured before the counted quantities have been drawn down by further processing. This is often referred to as the whip phenomenon. Its effect may be mitigated by measuring queue quantities as a total of the queue quantities at step B and the various intermediate steps between step P and step B. In addition, product is often put on hold if quality control indicates that a possibility of excess process variation may exist. When all or some of the product that was on hold gets returned to the various queues, it is entirely possible that a $Q_{MAX}$ value will be exceeded by more than a single lot.

Referring now to FIG. 2, three record files are required for the preferred implementation of the look-ahead method: a Step P Queue Data File, a Step B Queue Data File, and a Program Data File.

A record is generated in the Step P Queue Data File for each product lot arriving at the step P queue. Each record in the Step P Queue Data File contains a product identification field, a lot number field, a priority value field, and an in process flag field. In addition, the file has a single new work field which is set each time a new product lot is added to the file. Each product type has a priority value associated with it. Priority values are assigned by management to each of the products. In this implementation, a zero denotes the highest priority, a one denotes the next highest priority product, and so forth. Thus, a one-byte wide field will provide 16 priority values.

Each record in the Step B Queue Data File contains a product identification field, a lot number field, and an in process flag field. With the exception of the priority value field, each record in the Step B Queue Data File contains those same fields.

There is also a Program Data File, which contains one record for each product. Each record contains a product identification field, a $Q_{MAX}$ value field, a $Q_{MIN}$ value field, a $Q_{NOW}$ value field, and a Q flag field, $Q_{THR}$ value field, and a $Q_{AVL}$ value field. The $Q_{NOW}$ values are incremented as new lots are added to the step B queue and decremented as lots in the step B queue are removed therefrom (normally, this occurs as lots are processed and transferred to the following step, or B+1 step, queue). The $Q_{THR}$ values and the $Q_{AVL}$ values provide a look-behind enhancement to the look-ahead method. This is accomplished by establishing a threshold queue level ($Q_{THR}$) at step P for a newly selected products, and keeping track of the current lot quantities ($Q_{AVL}$) for each product at the step P queue. If only a single lot of a given product is available for processing, it may be more efficient to wait until more lots are queued at step P in order to justify two consecutive downtime periods, the first being required to convert the machine to a configuration for processing the newly selected product and, the second, to convert the same machine to a configuration for processing a subsequently selected product after all lots of the newly selected product queued at step P are processed. The $Q_{THR}$ values, like the $Q_{MIN}$ and $Q_{MAX}$ values, are set by management. The $Q_{AVL}$ values are handled much like the $Q_{NOW}$ values, in that they are incremented as new lots are added to the step P queue and decremented as lots in the step P queue are removed therefrom (normally, this occurs as lots are processed and transferred to the following step, or P+1 step, queue).

Figure 3B:
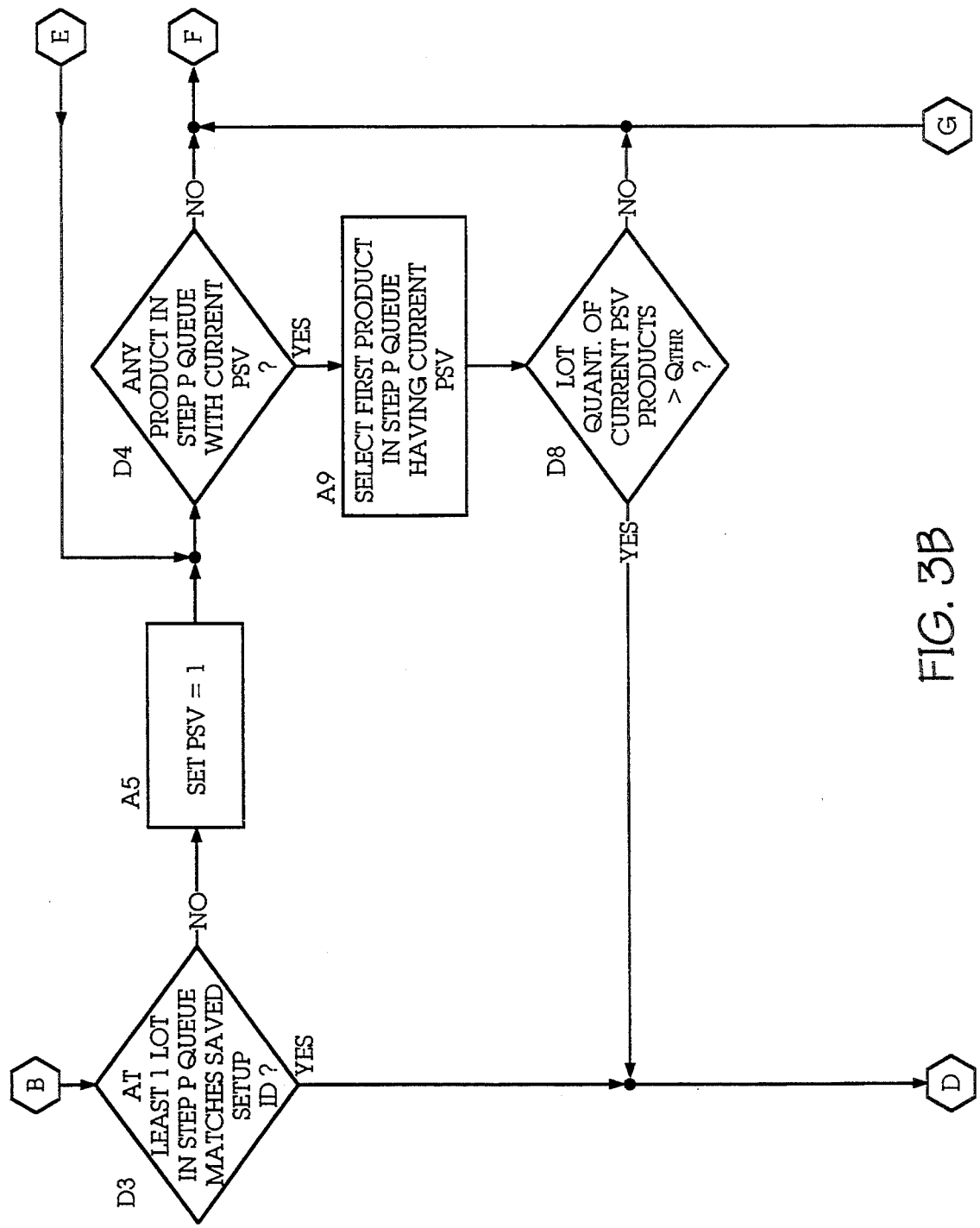
Figure 3C:
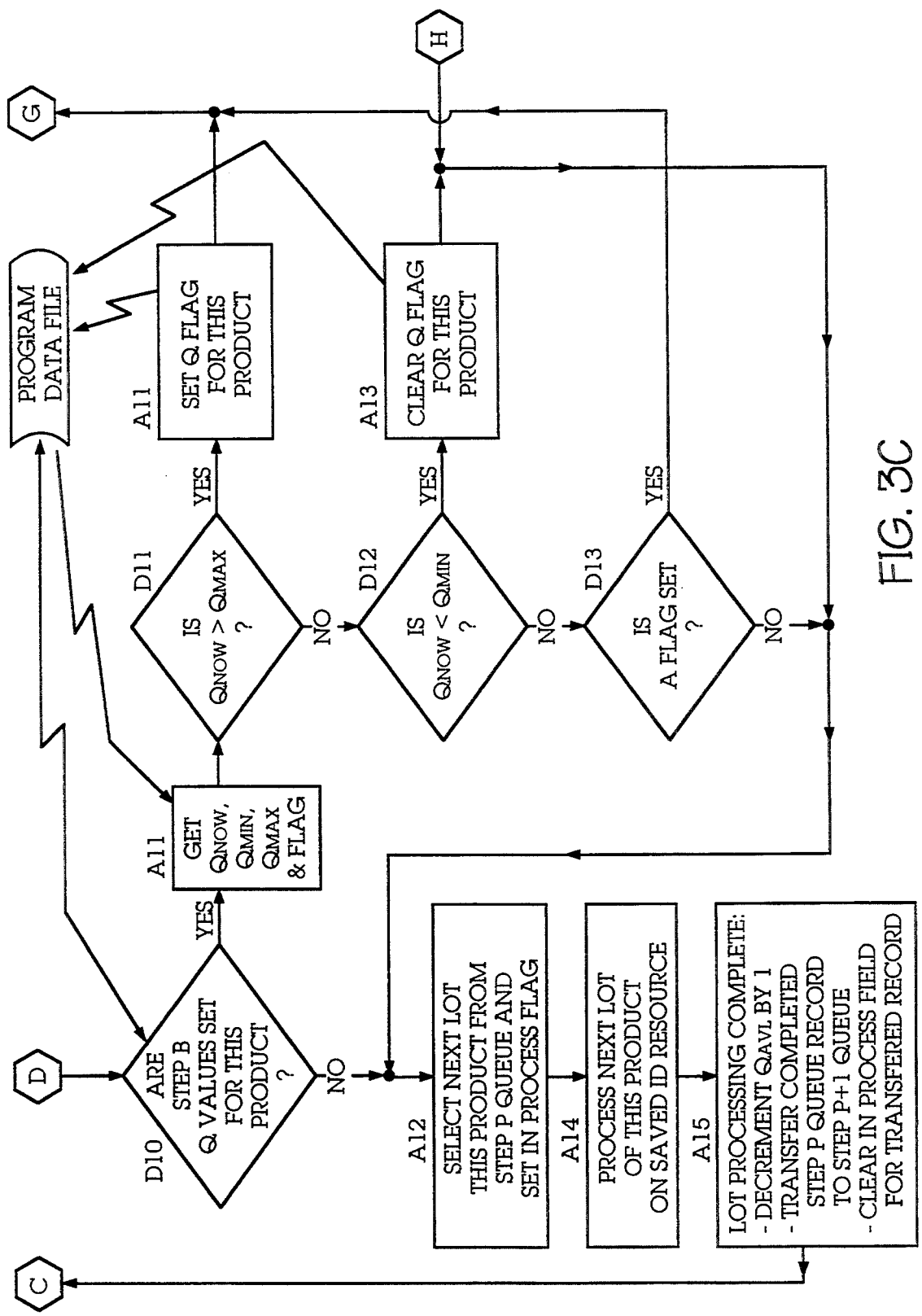
Figure 3D:
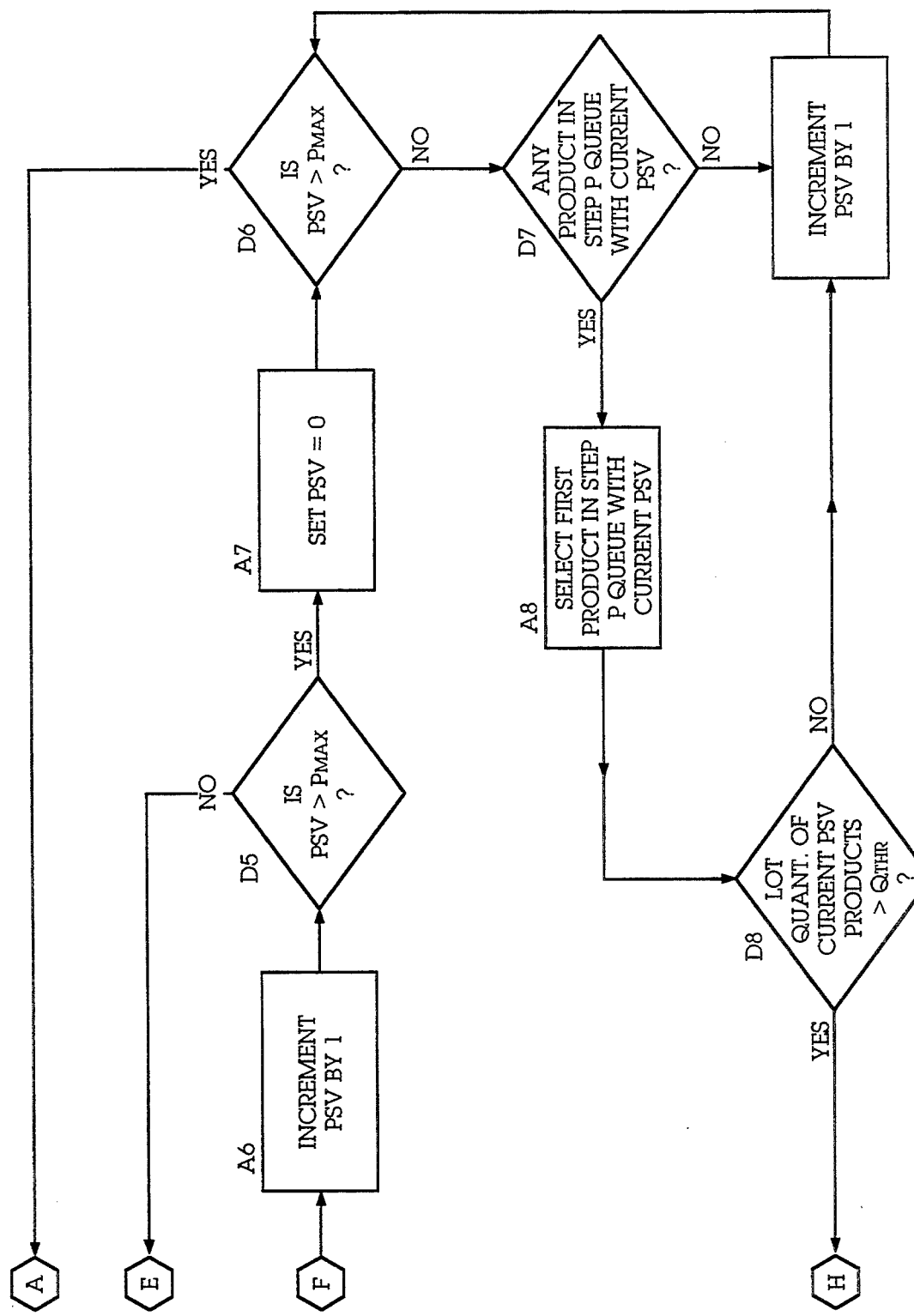

Referring now to FIG. 3, the look-ahead method is described in a system architecture flow chart which may be readily implemented in a program written in any one of a number of available high-level or low-level languages written for execution on an electronic digital computer. Because of size, the flow chart has been split into four interconnected sub-charts corresonding to FIGS. 3A-3D. In this flow chart, decision or conditional program steps within the logic flow chart are identified by the letter "D" (e.g., D1, D2, D3, etc.), while assignment or action program steps are identified by the letter "A" (e.g., A1, A2, A3, etc.). Starting in the upper left-hand corner of the chart (FIG. 3A), the program is normally in a "sleep" mode, and is interrupt driven. At least two interrupts are defined for the preferred implementation of the program. The first interrupt (program step A1) is generated whenever new lots of any product are transferred to the step P queue. The second interrupt (program step A2) is generated whenever a resource (e.g., a machine) completes the processing of a product lot.

Still referring to FIG. 3, either of the two interrupts prompts the program to query in program step D1 whether or not a resource is idle. A YES determination at D1 prompts the program to save both the resource ID and its setup ID step A3, thereby invoking program step A4; a NO determination invokes a query at program step D1 as to whether or not new work has been added to the Step P Queue. A NO determination at D2 returns the program to the "sleep" mode; a YES determination at D2 invokes program step A4.

Still referring to FIG. 3, step A4 selects the product that matches the saved setup ID on the idle resource. Program step D3 then determines whether or not there is at least one lot of product in the step P queue that matches the product selected in step A4. If the answer to the step D3 query is YES, program step D9 is invoked; if the answer to the D3 query is NO, an alternate product must be selected from those awaiting processing at the step P queue. In order to select the highest priority product, the priority search value (PSV) is set to zero, and a first search loop is initiated beginning with step D4. Step D4 accesses determines whether or not any product is in the step P queue which has the current priority search value. For this information, the program accesses the Program Data File. If the answer to program step D4 is YES, the program, in step A9 selects the product lot having the current PSV. Then, in step D8, the program determines whether or not a threshold quantity ($Q_{THR}$) Of the selected product is available for processing. If $Q_{AVL}$ (the lot quantity of the selected product in the step P queue) is greater than $Q_{THR}$, the program invokes step D9; if $Q_{AVL}$ is less than $Q_{THR}$, the program invokes step A6. If the answer to program step D4 is NO, the program also invokes step A6. In step A6, the priority search value is incremented by one, and step D5 is invoked. Step D5 determines whether or not the priority search value exceeds $P_{MAX}$. For the sake of simplicity, the value of $P_{MAX}$ will be determined by the number of different products. For example, if there are four products, each will have a different priority, and $P_{MAX}$ is 4. If the priority search value does not exceed $P_{MAX}$, the program returns to step D4; if the priority search value exceeds $P_{MAX}$, then the program will return to the sleep mode until interrupted.

Still referring to FIG. 3, upon the invocation of step D9, the program determines whether $Q_{MIN}$ and $Q_{MAX}$ values have been established for the selected product. If not, the program in step A11, selects the next lot of the currently selected product in the step P queue, and lot processing is begun when program Step A14 is invoked. When lot processing is complete, step A15 is invoked. Step A15 decrements the existing $Q_{AVL}$ value in the Program Data File, writes the step P queue data record for the completed lot to the step P+1 queue data file, and clears the Step P Queue Data File record for the completed lot.

If on the other hand, it is determined at step D9 that $Q_{MIN}$ and $Q_{MAX}$ values have been established for the selected product, program step A10 gets the $Q_{MIN}$, $Q_{MAX}$, $Q_{NOW}$, and Q flag values for the selected product. Program step D10 then determines whether $Q_{NOW}$ is greater than $Q_{MAX}$. A YES determination will cause the program to invoke step A11, which sets the Q flag for the selected product in the Program Data File, following which step, the program jumps to step A6. A NO determination at step D10 invokes step D11, which determines whether or not $Q_{NOW}$ is less than $Q_{MIN}$. A YES determination at D11 will clear the Q flag for the selected product in step A13, and the program will then jump to step A12. A NO determination at D11 will invoke step D12, which determines whether or not the Q flag is set for the selected product. If, so, the program invokes step A6; if not the program invokes step A12.

Although only a single embodiment of the look-ahead method for maintaining optimum queued quantities of in-process parts at a manufacturing bottleneck is disclosed, those having ordinary skill in the art of manufacturing control will recognize that changes and modifications may be made thereto without departing from the scope and the spirit of the invention as hereinafter claimed.

We claim:

1. A look-ahead method for maintaining optimum queued quantities of multiple in-process products at a manufacturing step B, which is a throughput bottleneck, by controlling the processing of multiple in-process products at manufacturing step P, step P being a manufacturing step prior to step B, said method comprising the following steps:
   (a) providing a data processing system having memory means for data storage, addressing means for updating and accessing data in said memory means, and processor means for comparing stored data values;
   (b) determining for which of the multiple in-process products a throughput bottleneck exists at step, B;
   (c) assigning a maximum step B queue lot quantity $Q_{MAX}$, a minimum step B queue lot quantity $Q_{MIN}$, and a step P threshold queue lot quantity $Q_{THR}$ to each product identified in step (b), said $Q_{MAX}$, $Q_{MIN}$, and $Q_{THR}$ values being stored in said memory means;
   (d) maintaining a running account of queued lot quantities for each product identified in step (b), said account being stored in said memory means, and including lot quantities queued for processing at step P and at step B;
   (e) assigning a set flag status to a product whenever the queued lot quantity at step B exceeds that product's assigned $Q_{MAX}$, said set flag status also be stored in said memory means;
   (f) clearing a set flag status whenever the queued lot quantity at step B for a particular product drops below that product's assigned $Q_{MIN}$;
   (g) when a machine at step P completes a lot of a currently selected product, processing an additional lot of a currently selected one of said multiple products if, according to the running account of lot quantities, at least one additional lot of the currently selected product is available for processing at step P and one of the following conditions exist, as determined by said processor means:
   (g-1) the number of lots of the currently selected product queued for processing at step B is less than $Q_{MIN}$; or
   (g-2) the number of lots of the currently selected product queued for processing at step B is greater than $Q_{MIN}$, less than $Q_{MAX}$, and the flag status for the currently selected product is clear;

(h) selecting a first alternate product for queue analysis if step (g) cannot be implemented;

(i) processing the first alternate product if there are ready for processing at the step P queue a number of lots of the first alternate product in excess of $Q_{THR}$ for that product, and one of conditions (g-1) or (g-2) exists for the first alternate product, as determined by said processor means;

(j) selecting a second alternate product for queue analysis if step (i) cannot be implemented; and (k) processing the second alternate product if there are ready for processing at the step P queue a number of lots of the second alternate product in excess of the $Q_{THR}$ for that product, and one of conditions (g-1) or (g-2) exists for the second alternate product, as determined by said processor means.

2. The look-ahead method of claim 1, wherein the case in which the flag status for the currently selected product is set, and there are no other products available for processing for which the flag status is clear includes the following scenarios:

(a) the number of lots of the currently selected product queued at step B is greater than $Q_{MIN}$, less than $Q_{MAX}$, the flag status for the currently selected product is set; or (b) the number of lots of the currently selected product queued at step B is greater than $Q_{MAX}$.

3. The look-ahead method of claim 2, wherein the lot quantity of a product queued for processing at step B includes not only lots queued for immediate processing at step B, but also those queued for immediate processing at manufacturing steps between step P and step B.

4. The look-ahead method of claim 2, wherein the lot quantity of a product queued for processing at step P includes not only lots queued for immediate processing at step P, but also those queued for immediate processing at manufacturing steps prior to step P.

5. The look-ahead method of claim 1, wherein the $Q_{THR}$ for each product is set sufficiently high to justify two consecutive downtime periods, the first being required to convert a machine used for processing products at step B bottleneck to a configuration for processing the first alternate product and, the second, to convert the same machine to a configuration for processing a subsequently selected product after all lots of the first alternate product queued at step P are processed.

6. The look-ahead method of claim 1, wherein a lot is defined as a whole number of in-process parts, said whole number being at least one.

7. A look-ahead method for maintaining optimum queued quantities of in-process parts at a manufacturing step B that has been determined to be a throughput bottleneck, said method controlling the production at a manufacturing step P which precedes step B and comprising the following steps:

(a) providing a data processing system having memory means for data storage, addressing means for updating and accessing data in said memory means, and processor means for comparing stored data values;

(b) assigning a maximum step B queue lot quantity $Q_{MAX}$, a minimum step B queue lot quantity $Q_{MIN}$, and a step P threshold queue lot quantity $Q_{THR}$ for each product which must be processed at step B, said $Q_{MAX}$, $Q_{MIN}$, and $Q_{THR}$ values being stored in said memory means;;

(c) maintaining a running account of queued lot quantities for multiple products which must be processed at step B, said running account being stored in said memory means, and including lot quantities queued for processing at step P and at step B;

(d) assigning a set flag status to a product whenever the queued lot quantity at step B exceeds that product's assigned $Q_{MAX}$, said set flag status also be stored in said memory means;

(e) clearing a set flag status whenever the queued lot quantity at step B for a particular product drops below that product's assigned $Q_{MIN}$;

(f) when a machine at step P completes a lot of a currently selected product, processing an additional lot of a currently selected one of said multiple products if, according to the running account of lot quantities, at least one additional lot of the currently selected product is available for processing at step P and one of the following conditions exist, as determined by said processor means:

(f-1) the number of lots of the currently selected product queued for processing at step B is less than $Q_{MIN}$; or (f-2) the number of lots of the currently selected product queued for processing at step B is greater than $Q_{MIN}$, less than $Q_{MAX}$, and the flag status for the currently selected product is clear;

(g) selecting a first alternate product for queue analysis if step (f) cannot be implemented;

(h) processing the first alternate product if there are ready for processing at the step P queue a number of lots of the first alternate product in excess of $Q_{THR}$, for that product, and one of conditions (f-1) or (f-2) exists for the first alternate product, as determined by said processor means;

(i) selecting a second alternate product for queue analysis if step (b) cannot be implemented; and (j) processing the second alternate product if there are ready for processing at the step P queue a number of lots of the second alternate product in excess of the $Q_{THR}$ for that product, and one of conditions (f-1) or (f-2) exists for the second alternate product, as determined by said processor means.

8. The look-ahead method of claim 7, wherein the lot quantity of a product queued for processing at step B includes not only lots queued for immediate processing at step B, but also those queued for immediate processing at manufacturing steps between step P and step B.

9. The look-ahead method of claim 7, wherein the lot quantity of a product queued for processing at step P includes not only lots queued for immediate processing at step P, but also those queued for immediate processing at manufacturing steps prior to step P.

10. The look-ahead method of claim 7, wherein a lot is defined as a whole number of in-process parts, said whole number being at least one.

11. A look-ahead method for maintaining optimum queued quantities of in-process parts at a manufacturing step B that has been determined to be a throughput bottleneck, said method controlling the production at a manufacturing step P which precedes step B and comprising the following steps:

(a) providing a data processing system having memory means for data storage, addressing means for updating and accessing data in said memory means, and processor means for comparing stored data values;

(b) assigning a maximum step B queue lot quantity $Q_{MAX}$ and a minimum step B queue lot quantity $Q_{MIN}$ for at least one product which must be processed at step B, said $Q_{MAX}$ and $Q_{MIN}$ values being stored in said memory means;

(c) maintaining a running account of lot quantities queued for processing at step B for those products assigned $Q_{MAX}$ and $Q_{MIN}$ values, said running account being stored in said memory means;

(d) assigning a set flag status to a product whenever the queued lot quantity exceeds that product's assigned $Q_{MAX}$, said set flag status also be stored in said memory means;

(e) clearing a set flag status whenever the queued lot quantity for a particular product drops below that product's assigned $Q_{MIN}$; and (f) assigning to those products having a clear flag status a higher priority for processing at step B than those products having a set flag status, and controlling production at step P responsive to a running account of lot quantities queued for processing at step B.

12. The look-ahead method of claim 11, wherein the lot quantity of a product queued for processing at step B includes not only lots queued for immediate processing at step B, but also those queued for immediate processing at manufacturing steps between step P and step B.

13. The look-ahead method of claim 11, wherein a lot is defined as a whole number of in-process parts, said whole number being at least one.

14. The look-ahead method of claim 11, wherein said running account also includes lot quantities queued for processing at step P.

15. The look-ahead method of claim 11, wherein the highest priority among products having a clear flag status is given to a product currently selected for processing at step P.

* * * * *